United States Patent
Trinkel

(10) Patent No.: US 7,949,878 B2
(45) Date of Patent: May 24, 2011

(54) TELECOMMUNICATION-ASSISTED TIME STAMP

(75) Inventor: Marian Trinkel, Kreuzau (DE)

(73) Assignee: Deutsche Telekom AG, Bonn (DE)

( * ) Notice: Subject to any disclaimer, the term of this patent is extended or adjusted under 35 U.S.C. 154(b) by 714 days.

(21) Appl. No.: 10/541,697

(22) PCT Filed: Dec. 19, 2003

(86) PCT No.: PCT/DE03/04190
§ 371 (c)(1),
(2), (4) Date: Apr. 18, 2006

(87) PCT Pub. No.: WO2004/064316
PCT Pub. Date: Jul. 29, 2004

(65) Prior Publication Data
US 2006/0230277 A1    Oct. 12, 2006

(30) Foreign Application Priority Data
Jan. 8, 2003    (DE) .................................. 103 01 100

(51) Int. Cl.
H04L 9/00    (2006.01)
(52) U.S. Cl. ........................................ 713/178; 713/162
(58) Field of Classification Search .......... 713/168–171, 713/176, 178, 179, 155, 156, 162; 726/2, 726/3, 4; 379/9, 121.01
See application file for complete search history.

(56) References Cited

U.S. PATENT DOCUMENTS

| | | | | |
|---|---|---|---|---|
| 5,444,780 A | * | 8/1995 | Hartman, Jr. | 380/30 |
| 5,805,704 A | | 9/1998 | Hsu | 380/48 |
| 5,982,506 A | * | 11/1999 | Kara | 358/405 |
| 6,289,453 B1 | | 9/2001 | Walker et al. | 713/175 |
| 6,510,236 B1 | * | 1/2003 | Crane et al. | 382/116 |
| 6,590,981 B2 | * | 7/2003 | Fruehauf et al. | 380/260 |
| 6,944,188 B2 | * | 9/2005 | Sinha et al. | 370/503 |
| 2002/0019933 A1 | * | 2/2002 | Friedman et al. | 713/160 |
| 2002/0169970 A1 | | 11/2002 | Candelore | 713/193 |

FOREIGN PATENT DOCUMENTS

| | | |
|---|---|---|
| DE | 198 45 199 | 4/2000 |
| EP | 0 345 952 | 12/1989 |
| EP | 0 528 572 | 2/1993 |
| WO | WO 98/14842 | 4/1998 |

OTHER PUBLICATIONS

International Search Report for PCT/DE2003/004190, dated Apr. 19, 2004, 4 pages.

* cited by examiner

*Primary Examiner* — Benjamin E Lanier
*Assistant Examiner* — Hadi Armouche
(74) *Attorney, Agent, or Firm* — Leydig, Voit & Mayer, Ltd.

(57) ABSTRACT

A method for providing a time stamp by using a tamper-proof time signal via a telecommunications network includes the steps of: receiving, at a central system, a request from a network user for a time signal. The time signal is encrypted by the central system with at least one key. The encrypted time signal is transmitted to the network user via the telecommunications network. The network user is provided with the same at least one key. At the central system and the network user, the at least one key is synchronously generated.

18 Claims, 1 Drawing Sheet

TELECOMMUNICATION-ASSISTED TIME STAMP

CLAIM OF PRIORITY

The present application claims the benefit of priority, under 35 U.S.C. §371, as a national phase application of International Application No. PCT/DE2003/004190, titled "Telecommunication-Assisted Time Stamp," filed Dec. 19, 2003, and the benefit of priority of German Application No. DE 10301100.5, filed Jan. 8, 2003.

FIELD

The present invention relates to a secure electronic time stamp, and in particular to providing a tamper-proof time signal via a telecommunications network.

BACKGROUND

The problem of a secure electronic time stamp occurs everywhere in applications where it is necessary to prove the time of creation of data or documents and/or the time of receipt of such electronic data. Especially due to the electronic distribution of mail, for example, in the form of e-mails, voice mails, faxes, etc., a secure time stamp becomes indispensable, especially since digital signatures require tamper-proof time information.

In principle, it is conceivable that a time signal intended for electronic time-stamping of data may be derived, for example, from a legally and/or officially recognized time signal transmitter. In Germany, such a time signal is broadcast, for example, by the DCF-77 longwave transmitter in Braunschweig. This time signal is, in fact, highly accurate, but not tamper-proof, resulting in the possibility of tampering with the transmitted time, which may lead to differences between the real time and the time specified in an electronic document. Therefore, misuse is possible in all cases where time stamps have to be paid attention to from an economic and legal point of view, A method for transmitting official time information is already known from DE 198 45 198, where time information is fed into the networks of a mobile network operator. According to this known method, the time information is encrypted by the mobile network operator and then transmitted over the mobile network to a terminal device user, who decrypts the time information in the terminal device. In this process, secure transmission, in each case based on the network operator's technology, is provided only for the period of transmission from the mobile network operator to the terminal device user. However, tamper-proofness cannot be guaranteed for the periods until the time information is received by the mobile network operator, as a result of which misuse is possible here, especially because of the open switching centers in communications networks.

SUMMARY

It is an aspect of the present invention to provide a tamper-proof, telecommunication-based method and system for providing a time stamp, in which the level of security is relatively high.

In an embodiment, the present invention provides a method for providing a time stamp by using a tamper-proof time signal via a telecommunications network. The method includes the steps of: receiving, at a central system, a request from a network user for a time signal; encrypting said time signal by the central system with at least one key; transmitting the encrypted time signal to the network user via the telecommunications network; providing the network user with the same at least one key; and synchronously generating, at the central system and the network user, the at least one key.

DETAILED DESCRIPTION

Figure 1:
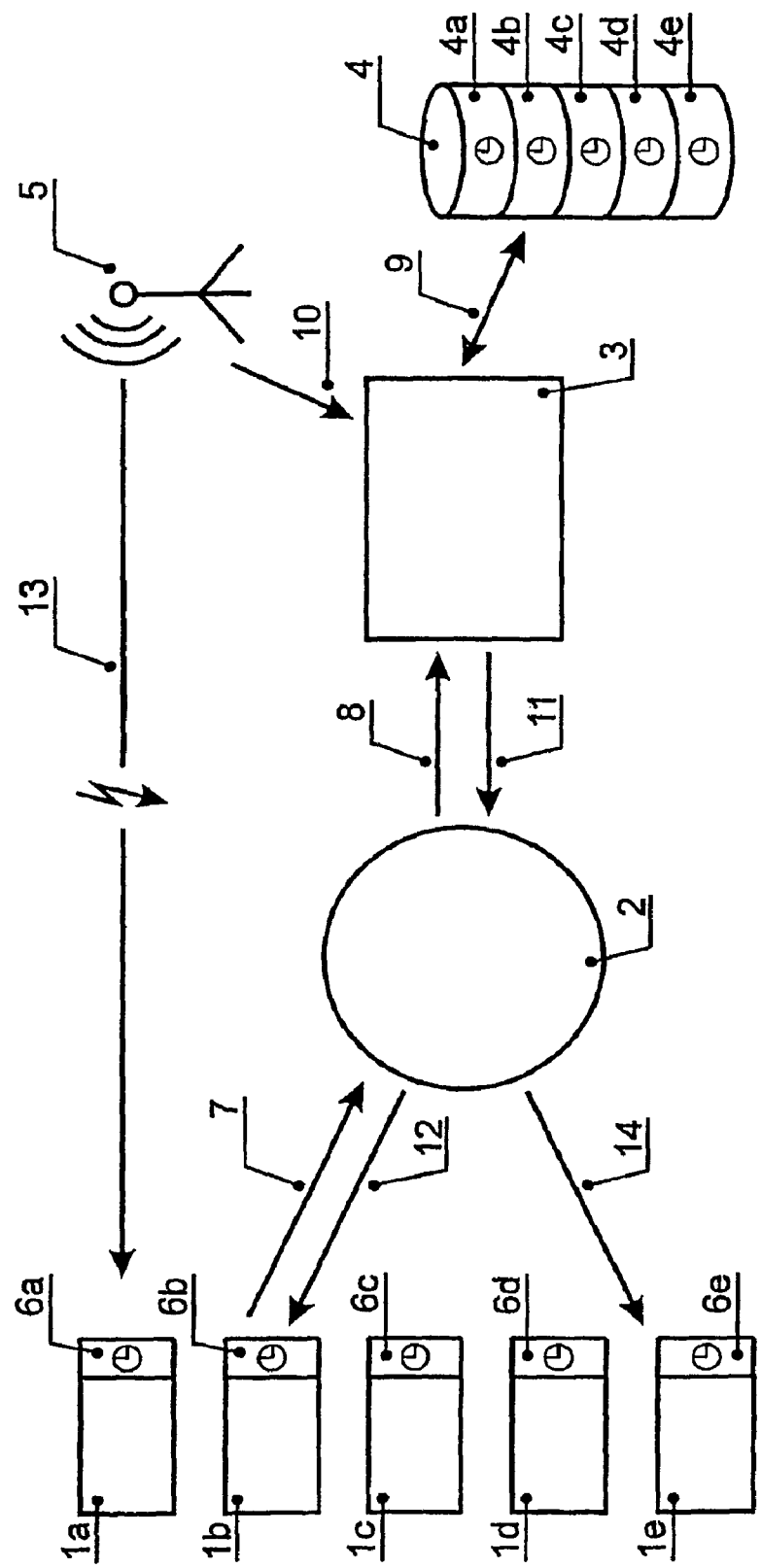
FIG. 1 illustrates an embodiment in accordance with the present invention.

An embodiment of the present invention includes a network user requesting a time signal from an, in particular, certified central system; this time signal preferably being an officially recognized time signal, such as that of the DCF-77 transmitter. The preferably certified central system encrypts this time signal with at least one key already before it is fed into a telecommunications network. It is only after this encryption that the time signal is fed into a telecommunications network and transmitted over this telecommunications network to the network user. This network user is then able to decrypt the encrypted data packet with the same key or keys and, thus, to receive a tamper-proof time signal.

In comparison with the known prior art method, the method embodying the present invention already has the advantage of encrypting the officially recognized time signal already before it is fed into a communications network; the encryption being done by a preferably certified central system, which may be formed, for example, in a so-called "trust center". This central system, with its increased safety requirements, provides a higher level of security than the method described in the prior art, since the switching centers, which are particularly vulnerable to tampering, can here no longer constitute any points of attack, because encryption has been shifted to an earlier stage.

The actual encryption and decryption of the time signal, both at the central system and at the network user, can be carried out using encryption algorithms which require at least one key for encrypting the information and which are well-known to one skilled in the art. The type of encryption, for example, by means of digital signatures, hash functions, etc., is a matter of choice by the person skilled in the art.

As described earlier, the encryption provided at the central system and the subsequent decryption of the time signal at the network user require both the central system and the network user to have the same key or keys. Since, here again, tampering is, in principle, possible, namely because the possibility of spying a key that is used for a longer period of time, one preferred refinement provides for at least one key, which is stored both at the central system and at the network user, to change synchronously at both storage sites, especially after predetermined time intervals. Thus, this key is always present identically at both storage sites at the same points in time, but changes preferably at short time intervals of, for example, only a few seconds, so that the possibility of spying such a key is effectively reduced. Accordingly, the method is carried out using a key which is variable over time and which is present identically at the network user and at the central system. In principle, it is also possible for a plurality of such keys to be present and used in the above-mentioned method.

The time-synchronous changing of this key at the network user and at the central system is preferably achieved by providing at least one clock system at both the network user and at the central system; the clock system at the network user being assigned to a clock system at the central system, and both clock systems, in turn, being assigned to one specific network user. These two clock systems operate synchronously in time and are provided in order for a key that changes over time to be generated at the network user and at the central system as previously described, so that this synchronously changing key can be used for the encryption and transmission of the time signal. Optionally, it is also possible to use a plurality of clock systems in order to generate a plurality of keys.

Here, provision can be made for the two clock systems to be formed by hardware, and to be issued by the, in particular, certified central system after a network user has requested registration. After the registration of a network user for the method embodying the present invention, the central system will synchronize two clock systems in time, keep one and make one available to the network user, for example, for purchase or as a loan. This provides absolute synchronism of the two clock systems, as well as the identity of the key at both storage sites at the same points in time.

In accordance with the method embodying the present invention, different clock systems, which are respectively assigned to different network users, will need to be distinguished from each other. To this end, the embodiment preferably provides that when a network user requests a time signal, a clock system which is assigned to this network user and present at the central system is determined by the central system using a transmitted identifier. This identifier may, for example, be one that uniquely identifies the network user within the communications network. The identifier in question may, for example, be the so-called "Call Line Identity" (CLI), in cable-based telephone networks, the so-called "Home Location Register" (HLR) in mobile telecommunications networks, the so-called IP address in the Internet, or, in other systems, the identifier may include PIN and PAN numbers, which can also be used for unique identification.

Uniqueness is essentially provided already because each assignment of identifiers is issued only after personal identification of the owner, for example, by an identity card. This is the case, for example, for the CLI when applying for a telephone connection, the HLR when subscribing to a mobile phone contract, and for the IP address in the Internet when registering with an internet provider, who, even in the case of dynamic address assignment, records at least the provider's internal identifier.

Accordingly, such an identifier, which is provided by the network user when requesting the time signal, allows the central system to determine the clock system uniquely assigned to this network user, to use the key generated by this clock system to encrypt the time signal, and to subsequently send the encrypted time signal over the telecommunications network to the network user.

Alternatively, the time signal may be encrypted by using the additionally provided identifier of the network user alone, independently of a key generated by a clock system, or, in a refinement of the embodiment, both the key generated by the clock system and the transmitted identifier may be used for encryption, either simultaneously and/or in succession.

In addition to the fact that time signals are transmitted in a tamper-proof manner, the above-mentioned method further has the advantage of providing a reference to the location of the network user, which results from the identifier provided, such as, for example, the CLI, the HLR, or the like. This location identifier, or also additional identification of the requesting network user, helps further increase the level of security, because these identifiers are already difficult to tamper with.

Thus, in accordance with embodiments of the present invention, after the time signal has been requested and transmitted from the described central system, the network user has available a tamper-proof, in particular, certified time signal, which can be used to time-stamp, for example, data to be transmitted over the telecommunications network. The time signal so obtained can also be used for all kinds of time stamping, even if there is no intention to further transmit the data.

Thus, for example, at the moment a network user receives data from a third party over a telecommunications network, the network user may record the time of receipt of this data by means of a time stamp; the time stamp being obtained from a central system in accordance with the method described above. To this end, upon receipt of the data, the network user only has to request the time signal from the certified central system over the network.

In one refinement of the above-described method, this method may also be used to transmit data with a tamper-proof time stamp over a telecommunications network from a first network user to a second network user This may preferably be accomplished in that the data which from a first network user [sic], along with a time stamp in the form of a time signal obtained in accordance with the previously described method, is transmitted to a second network user directly or indirectly via the central system.

Thus, after receipt of the time signal from the central system, the data to be transmitted and/or the time signal may be encrypted by the sending first network user during transmission. In accordance with embodiments of the present invention, it is possible both to limit encryption to the data or to the time signal alone, or to apply encryption to both the data and the time signal simultaneously. For encrypted transmission of the data to the second network user, it is particularly preferred to use the key that is present at both the network user and at the central system synchronously in time. Alternatively, encryption is carried out using the identifier of the network user or, in a preferred embodiment, encryption is carried out using both options, i.e., both the key and the identifier, either simultaneously or in succession.

Embodiments of the present invention may provide that if the data is transmitted indirectly via the central system, the central system forwards the data to the second, receiving network user, allowing said second network user to be sure that the data has been received at the central system at the certified point in time. This may be used as a means for monitoring receipt of the data, provided that the network user who is to receive the data has registered with the central system. The central system and the receiving user may use the inventive method for this forwarding too.

Alternatively, a certified central system is provided directly at a network user if this network user must prove the time of receipt of data. For example, this may always be the case for offices and authorities, such as patent offices, where, according to the current state of the art, the receipt of documents takes place by punching holes in the paper documents [sic]. In contrast, the method embodying the present invention allows electronic stamping of electronic documents. It may also be used in tax offices and other authorities.

Such an authority or office, which must maintain a record of the time of receipt of electronic documents, will preferably use a certified central system itself and allow time stamping using the method described above.

For further protection, the central system may issue an acknowledgement of receipt, so that the first, sending communications user receives feedback that the document has been received with its time stamp at the receiver. For the acknowledgement of receipt itself, it is possible, for example, to transmit the time signal using the above-described method again, or the acknowledgement is via a different type of data transmission.

The above-described method allows to easily verify that a transmitted document has not been tampered with because, for example, after the time signal is transmitted upon request of a first telecommunications user, this user has available the untampered, securely transmitted time signal; said signal representing the point in time at which the time stamp was sent by the central system.

Given sufficiently short data propagating delays, the network user will ideally use the same key with his/her synchronously running clock system to decrypt the transmitted time signal. If, due to an interval time-out, the clock system at the network user should already have advanced and generated a next key, the network user will find out with his/her encryption system that no useful time can be decrypted from the received data packet and will possibly use a preferably stored previous key of the clock system. In case no useful time should be able to be decrypted with this previous key either, then the system uses the key preceding this one, and so on until a maximum tolerable signal time-out is detected, which suggests that the received time key is invalid, so that possibly a request is made for a new time key.

Upon successful decryption of the time signal, said signal is used, as described above, for example for time-stamping received data and/or for sending the data to a receiver, and is encrypted using the key newly generated by the clock system and subsequently sent to the central system either of a receiver or for forwarding to a receiver where the decryption is performed within a tolerable time interval using the same method described above. In case the decryption should be unsuccessful, this means that either the transmitted data packet has been tampered with, or that a maximum tolerable data propagation delay has been exceeded.

Thus, using the method embodying the present invention, it is possible to ensure that data to be transmitted was sent at a specific point in time, said point in time corresponding to the time signal that was provided by the central system. After decryption of the time of dispatch, the receiver in the communications network may accept transmitted data as timely if a possible, very long data propagation delay is not the fault of the sender.

The above-described methods can preferably be implemented by a system for generating a tamper-proof time stamp in network-based communication systems; the system including a central system and one each clock system on the side of a network user and on the side of the central system; the clock systems being assigned to each other and to a network user and operating synchronously to generate a key which changes, in particular, at intervals of time. Using this key, an, in particular, officially recognized time signal can be encrypted in the central system, sent to a network user and subsequently decrypted by said network user, so that this network user has available a tamper-proof time-stamp.

An exemplary embodiment of the present invention is shown in the drawing below. FIG. 1 shows a plurality of network users 1a-1e, who may be communication with each other over a telecommunications network 2. Moreover, a central system 3, which is capable of providing a tamper-proof time signal, is provided in connection with the telecommunications network 2. This tamper-proof time signal may be based on an officially and/or legally recognized time signal transmitter 5, such as the DCF-77 transmitter in Germany.

It is, in principle, possible for a telecommunications user 1a to receive the time signal from time signal transmitter 5 via a direct path 13. However, this time signal is never tamper-proof because, the generation of this signal can be easily imitated, and thus, false time signals may be generated. Moreover, the official time signal cannot be received in all regions due to shadowing of the radio waves.

In accordance with the embodiment of the present invention, a network user 1b requests a time signal 5/10 from a central system 3 connected to network 2; the request being made via a communication connection 7 and network 2 as well as communication connection 8. During this process, user 1b automatically transmits an identifier, for example, when communicating over the telephone or over the Internet, where both the IP address and the cable-based telephone number or call line identity are transmitted.

This identifier provided to central system 3 allows the central system to determine the clock system 4b assigned to the network user from a collection of clock systems 4, possibly using a database, and to read out a key from this clock system 4b, said key being used to encrypt the time signal provided by signal transmitter 5 via communication path 10. Possibly, the identifier of network user 1b is also used to further encrypt the time signal.

Central system 3 sends the encrypted time signal to user 1b via communication path 11, network 2 and communication path 12; said user, after receiving the signal, being able to decrypt the time signal with the synchronous key obtained from his/her own clock system 6b, and to use it further. A further use may be to time-stamp data that the user has received from somewhere else, or wishes to send somewhere else.

In comparison with alternative communication path 13, namely the direct reception of the time signal, the described path for receiving the time signal has the advantage of being much more tamper-proof, because the encryption and decryption of the time signal already take place outside the pure transport area across telecommunications network 2. Therefore, in comparison with the above-mentioned prior art, it is here possible to clearly separate the processing and encryption of the data from the transport of the data via a network operator.

The time signal so obtained allows user 1b to either stamp and store data received from a third party, or to, in turn, attach the time signal to data to be sent, and to newly encrypt it with the key of his/her own clock system 6b and send it to central system 3 installed at a receiver, or to send the data, for example, via communication connection 11, network 2 and connection 14, to a network user 1e who has also registered with the method.

For tamper-proof transport of the time signal, central system 3 must only ensure that it itself receives the time signal uncorrupted, for example, from an officially recognized transmitter, such as DCF-77. In a preferred case, this can be accomplished if the time signal transmitter, for example the DCF-77 transmitter, itself assumes the function of the certified central system, so that virtually no communication paths exist for an unencrypted time signal.

On the other hand, any office or authority that has to acknowledge a time of receipt may retreat to an internal clock signal and send this clock signal to telecommunications users as a reference that is recognized at least internally within the office.

What is claimed is:

1. A method for providing a time stamp by using a tamper-proof time signal via a telecommunications network comprising the steps of:

receiving, at a central system, a request from one of a plurality of network users for a time signal, the central system comprising a plurality of clock systems, wherein each of the plurality of clock systems of the central system is uniquely assigned to one of the plurality of network users, the request including an identifier uniquely assigned to the network user;

identifying, by the central system based on the received identifier uniquely assigned to the network user, one of the plurality of clock systems thereof uniquely assigned to the network user;

encrypting said time signal by the central system with at least one key obtained from the clock system uniquely assigned to the network user;

transmitting the encrypted time signal to the one of the plurality of network user assigned to the identified clock system via the telecommunications network;

synchronously creating the at least one key by the clock system of the central system uniquely assigned to the network user and a clock system of the network user corresponding to the uniquely assigned clock system of the central system; and determining, by the central system, a location of the network user based on the identifier uniquely assigned to the network user.

2. The method as recited in claim 1, wherein the synchronously creating is performed so as to change the at least one key synchronously after predetermined time intervals.

3. The method as recited in claim 1, further comprising the steps of:

determining, by the central system, the clock system uniquely assigned to the network user using the identifier uniquely assigned to the network user, wherein the identifier is the network address of the network user.

4. A method for transmitting data with a tamper-proof time stamp over a telecommunications network from a first network user to a second network user, comprising the steps of obtaining a time signal in accordance with a method as recited in claim 1;

transmitting the time signal and the data from the first network user to the second network user one of directly and indirectly via the central system.

5. The method as recited in claim 4, further comprising the steps of:

encrypting, by the first network user, at least one of the data and the time signal during transmission.

6. The method as recited in claim 4, wherein the central system is provided at the second network user.

7. The method as recited in claim 4, further comprising the step of returning, by the central system, an acknowledgement of receipt to the first network user.

8. A system for generating a tamper-proof time stamp in network-based communication systems, the system comprising:

a central system connected to the network-based communication system, the central system comprising a plurality of clock systems; and a plurality of network users connected to the network-based communication system, each of the plurality of network users comprises a clock system, wherein each of the clock systems at the central system is uniquely assigned to one of the plurality of network users, wherein the clock system of each network user and the respective clock system of the central system are configured to operate synchronously so as to create at least one changeable key, wherein the central system is configured to receive a request from one of the plurality of network users and encrypt a time signal using the at least one changeable key obtained from one of the plurality of clock systems uniquely assigned to the network user, the request including an identifier uniquely assigned to the network user, the central system further configured to send the encrypted time signal to the network user, and further configured to identify, based on the received identifier uniquely assigned to the network user, one of the plurality of clock systems thereof uniquely assigned to the network user, the central system further configured to determine a location of the network user based on the identifier uniquely assigned to the network user; and wherein the network user is configured to decrypt the encrypted time signal.

9. The system as recited in claim 8, wherein the central system includes a time signal transmitter.

10. The method as recited in claim 5, wherein a central system is provided at the second network user.

11. The method as recited in claim 5, wherein the central system is configured to return an acknowledgement of receipt to the first network user.

12. The method as recited in claim 6, wherein the central system is configured to return an acknowledgement of receipt to the first network user.

13. The method as recited in claim 1, further comprising the step of decrypting, by the network user using the at least one key, the transmitted encrypted time signal.

14. The method as recited in claim 1, wherein the central system is a certified central system.

15. The method as recited in claim 1, wherein the time signal is an officially recognized time signal.

16. The method as recited in claim 3, wherein the at least one key is created by the uniquely assigned clock system based on the identifier uniquely assigned to the network user.

17. The system as recited in claim 8, wherein the at least one-changed key is synchronously created at intervals of time.

18. The system as recited in claim 8, wherein the time signal is an officially recognized time signal.

* * * * *